United States Patent Office 3,446,834
Patented May 27, 1969

3,446,834
CATALYTIC AMMOXIDATION OF OLEFINS TO NITRILES
Enrico Cavaterra and Natale Ferlazzo, Milan, Italy, assignors to Montecatini Edison S.p.A., Milan, Italy, a corporation of Italy
No Drawing. Filed Dec. 19, 1966, Ser. No. 602,501
Claims priority, application Italy, Dec. 28, 1965, 28,833/65
Int. Cl. C07c *121/02, 121/32*
U.S. Cl. 260—465.3                           10 Claims

ABSTRACT OF THE DISCLOSURE

A catalyst of an oxygenated tellurium compound and an oxygenated cerium compound, the tellurium:cerium ratio therein preferably ranging from about 9:1 to about 1:1, and a process for the preparation of unsaturated nitriles by reacting an olefin, ammonia and either oxygen or an oxygen-containing gas in the presence of such catalyst.

BACKGROUND OF THE INVENTION

The present invention relates to catalysts and to a catalytic process for the preparation of nitriles. More particularly, the invention relates to an improved process for producing acrylonitrile and to particular catalysts for use in such process.

Processes are known in which an olefin is reacted with ammonia and oxygen in the presence of specific catalysts in order to obtain unsaturated nitriles.

The known catalysts comprises different elements in the form of acids or salts of, for example, molybdic, phosphomolybdic and phosphotungstic acids; phosphoric acids activated by various elements, bismuth compounds, phosphorous oxygen, vanadium and other elements.

Most of such processes do not afford, however, fully satisfactory results. They exhibit a number of drawbacks such as a relatively low selectivity, i.e. a low yield in the desired unsaturated nitrile which is obtained, together with great quantities of carbon oxides and by-products.

These by-products of course give rise to a loss in starting material, and make it difficult to recover the desired unsaturated nitrile in pure state.

Other drawbacks of the known processes are, in general, the low conversion of reactants and the necessity of using long contact times, and, thus, a low productivity of the catalyst.

All these drawbacks may be overcome through the process of this invention, which process concerns the production of unsaturated aliphatic nitriles by reacting an olefin with oxygen and ammonia.

The process according to the invention is carried out in the presence of catalysts that permit one to attain high yields of unsaturated nitriles and high conversions of the reactants, with relatively short contact times.

Furthermore, the catalysts according to the present invention have a long life without any decrease in their catalytic activity and do not require any reactivation.

THE INVENTION

Therefore, an object of the present invention is that of providing a process for obtaining an unsaturated nitrile, which process comprises contacting a gaseous mixture of an olefin having three or four carbon atoms, ammonia and oxygen or an oxygen containing gas, with a catalyst, whose composition will be more fully specified hereinafter, at a temperature comprised between 350° and 550° C. and at a pressure around atmospheric pressure.

The catalysts according to the present invention are comprised of tellurium, cerium and oxygen in atomic ratios Te:Ce comprised between 9:1 and 1:1, while the oxygen is present in an amount just sufficient to provide said elements in the form of oxides or other oxygenated compounds. They are effective when used as such, as well as when suitably supported on carriers of the conventional type, and they may also be used both in fixed bed, as well as in fluid bed.

The process according to this invention may be applied to propylene in order to yield acrylonitrile and to isobutene in order to obtain methacrylonitrile.

The olefin, other than in pure state, may also be employed in the presence of paraffinic hydrocarbons inert to the operating conditions, and which act as diluents.

The oxygen required by the reaction may be supplied as such or in the form of an oxygen containing gas such as, for example, air. This latter may be more convenient both for strictly economic reasons and for the presence of nitrogen which accompanies the same and which acts as an inert diluent, thereby facilitating the control of the thermal reaction.

The quantity of oxygen or of the oxygen containing gases, which may be used with respect to the olefin, may vary within wide limits. The molar ratios oxygen/olefin are preferably comprised between about 1:1 and about 3:1.

The ammonia is used in quantities that may also vary within very wide limits with respect to the olefin. However, the molar ratio between ammonia and olefin is preferably comprised between about 0.6:1 and about 2:1.

The high selectivity of the catalysts according to the invention permits of almost complete exploitation of the ammonia, so that only a slight excess of ammonia with respect to the olefin is necessary in the reaction medium.

Atmospheric pressure is generally quite sufficient for conducting the reaction, but the reaction may also be conducted at superatmospheric pressures.

The reaction temperature may be comprised between 350° and 550° C., but temperatures comprised between 380° and 500° C. are the preferred because at these latter temperatures high conversions are attained even for relatively short contact times, as will clearly appear from the examples set forth herein.

The contact times (for contact time is meant the time during which one unit volume of the gaseous mixture fed, measured under the average temperature and pressure conditions existing in the reactor, comes into contact with the apparent unit volume of the catalyst), may vary within wide limits, for example, from 0.1 to 20 seconds, but preferably from 0.5 to 15 seconds.

The catalysts according to this invention, when in association with a carrier, are prepared in a proportion of active part to carrier which is preferably comprised between 15% to 50% by weight of active part, calculated as the sum of the oxides as the maximum valency, and 85–50% of carrier.

Several substances may be used as a carrier; amongst these may there be mentioned silica, alumina, alundum, fireclays and the like, both in the form of powders or suitable granulometry and in the form of granules, or as silica or alumina gels.

Particularly good results were achieved by operating with a carrier constituted by a commercial macroporous, microspheroidal silica.

When it is desired to operate with said suitably supported catalysts, according to a preferred form of this invention, the impregnation of the carrier with the active part is carried out in the following way:

$Ce(NO_3)_3 \cdot 6H_2O$ and $H_2TeO_4 \cdot 2H_2O$ are dissolved in water and in concentrated nitric acid.

The solution thus obtained is used for impregnating the silica which constitutes the carrier, after its volume has been corrected by the addition of water in such quantity as to be equal to the volume of the pores of the silica to be impregnated.

The impregnation is carried out by slowly pouring the solution onto the silica while under stirring. The stirring of the impregnated silica is maintained for about one hour and it is then left to settle for eight hours.

Thereupon, the mass is dried at 110° C. for a few hours and is then activated in the presence of air at a temperature comprised between 450° C. and 600° C. for a period ranging from 1 to 20 hours.

The activation must, in any event, be carried out at temperatures equal to or higher than the temperature at which the catalyst will operate.

In order to further illustrate the present invention and the advantages thereof, the following specific examples are given, it being understood that the same are intended merely as illustrative and in no wise limitative.

The results obtained in the examples are deduced both from the chromatographic analysis of the gases coming out of the reactor and from the quantitative weight and volumetric analysis of the condensed products and from the analysis of the uncondensable compounds through an Orsat apparatus.

Examples 1 to 6 relate to the preparation of the catalysts according to this invention. The remaining examples concern the ammoxidation of olefins in the presence of the above mentioned catalysts.

In the present invention the terms used hereinunder have the following meaning:

Percent conversion of the olefin $$= \frac{\text{mole of reacted olefin}}{\text{mole of olefin fed}} \times 100$$

Net yield or selectivity = percent yield of product X with reference to the converted olefin $$= \frac{\text{weight of carbon in product X}}{\text{weight of carbon in the converted olefin}} \times 100$$

Gross yield = percent yield of product X with respect to the olefin fed in $$= \frac{\text{weight of carbon in product X}}{\text{weight of carbon in the olefin fed}} \times 100$$

EXAMPLE 1

43.4 g. of cerous nitrate at 99.9% and 11.5 g. of telluric acid at 98.5% were dissolved in 40 g. of water and 10 g. of nitric acid at 65%.

The solution thus obtained was slowly poured, under stirring, onto 78 g. of commercial macroporous microspheroidal silica.

The stirring was maintained for an hour and the mass was then left to settle for 8 hours, after which it was dried in a muffle at 110° C. for 12 hours.

Thereupon, the mass was activated in the presence of air at 500° C. for 8 hours.

The product thus obtained exhibited high catalytic activity and was used in the ammoxidation reaction of the olefins appearing in the following examples.

In the Table which follows there are recorded data relating to Examples 2 to 6 concerning the preparation of the catalysts obtained by operating according to Example 1:

TABLE 1

| Example | Formula and composition, percent mol | | | | Quantity in g. | | | | |
|---|---|---|---|---|---|---|---|---|---|
| | $CeO_2$ | $TeO_2$ | $CeO_2$ | $TeO_2$ | $Ce(NO_3)_3.6H_2O$ | $H_2TeO_4.2H_2O$ | $HNO_3$ 65% | $H_2O$ | Silica |
| 2 | 1 | 1 | 50 | 50 | 21.7 | 11.5 | 8 | 30 | 48.2 |
| 3 | 1 | 2 | 33.3 | 66.6 | 21.7 | 23 | 10 | 45 | 76.4 |
| 4 | 1 | 3 | 25 | 75 | 15.6 | 24.5 | 10 | 25 | 73.6 |
| 5 | 1 | 4 | 20 | 80 | 11.8 | 24.5 | 10 | 30 | 69.3 |
| 6 | 1 | 9 | 10 | 90 | 7.8 | 36.7 | 10 | 40 | 91.4 |

EXAMPLE 7

4.5 cc. equal to 2.7 g. of a catalyst prepared according to Example 1, were put into a reactor constituted by a stainless steel pipe suitably heated, to form a fixed bed.

Over the catalyst a gaseous mixture constituted by 8.33% in volume of propylene, 8.33% in volume of ammonia, 83.3% in volume of air, was passed in such a quantity as to attain a contact time of 2.5 seconds of the mixture itself measured at the temperature and pressure conditions existing in the catalytic bed, with the catalyst.

The reaction was carried out at atmospheric pressure, at a temperature of 400° C.

The products of the reaction, analyzed by gas chromatography evidenced the following results, calculated on converted propylene:

|  | Percent |
|---|---|
| Acrylonitrile | 78.4 |
| Acetonitrile | 1.9 |
| $CO_2$ | 16.8 |
| CO | 1.45 |
| HCN | 1.4 |

In the table of the next page are indicated the conditions and recorded all the data relating to Examples from 8 to 32, obtained by operating according to Example 7.

It was noticed that by operating in the same way but in fluid bed, altogether similar results were obtained, while it turned out that the thermal control of the course of the reaction was quite facilitated, especially when operating on an industrial scale.

TABLE 2

| Example No. | Ratios Air/propylene | Ratios NH₃/propylene | Contact time, sec. | Temperature °C. | Conversion propylene, percent | Net yield Acrylonitrile | Net yield Acetonitrile | Net yield Acrolein | HCN | CO₂ | CO | Gross yield acrylonitrile, percent | Active part |
|---|---|---|---|---|---|---|---|---|---|---|---|---|---|
| 8 | 10 | 1 | 2.5 | 440 | 53.1 | 64.2 | 1.2 | | 1.1 | 30.6 | 2.97 | 34.1 | 33.3% TeO₂. |
| 9 | 10 | 1 | 2.5 | 460 | 63.4 | 53.1 | 1.3 | | 1.1 | 41 | 3.56 | 33.6 | 66.7% CeO₂. |
| 10 | 10 | 1 | 2.5 | 400 | 33.1 | 84.5 | Tr. | | Tr. | 13.9 | 1.57 | 28 | 50% TeO₂. |
| 11 | 10 | 1 | 2.5 | 440 | 54.8 | 73.1 | Tr. | Tr. | Tr. | 23.8 | 3 | 40 | 50% CeO₂. |
| 12 | 10 | 1 | 2.5 | 460 | 86.8 | 64.5 | Tr. | Tr. | Tr. | 32.3 | 3.16 | 43.2 | |
| 13 | 10 | 1 | 2.5 | 400 | 41.3 | 82.1 | 2.5 | | 2 | 13.3 | | 33.8 | |
| 14 | 10 | 1 | 2.5 | 440 | 64.9 | 72.2 | 1.65 | | 1.3 | 22.2 | 2.63 | 46.8 | 66.7% TeO₂. |
| 15 | 10 | 1 | 2.5 | 460 | 72.7 | 69.9 | 1.1 | | 1 | 25.4 | 2.55 | 50.8 | 33.3% CeO₂. |
| 16 | 10 | 1 | 2.5 | 400 | 55.8 | 81.2 | 2.1 | | 1.5 | 14.3 | 1 | 45.3 | 75% TeO₂. |
| 17 | 10 | 1 | 2.5 | 440 | 74.9 | 74.5 | Tr. | Tr. | Tr. | 23.6 | 1.86 | 55.8 | 25% CeO₂. |
| 18 | 10 | 1 | 2.5 | 460 | 79.7 | 63.9 | 4 | | 2.8 | 26.6 | 4 | 50.9 | |
| 19 | 10 | 1 | 2.5 | 440 | 60.1 | 60.1 | 2.4 | | 2 | 33.1 | 2.3 | 36.1 | |
| 20 | 10 | 1 | 2.5 | 400 | 45.8 | 81.8 | 3.7 | | 2.7 | 11.7 | | 45.8 | 80% TeO₂. |
| 21 | 10 | 1 | 2.5 | 440 | 76.7 | 74 | 2 | | 1.3 | 21.2 | 1.38 | 54.7 | 20% CeO₂. |
| 22 | 10 | 1 | 2.5 | 460 | 83.4 | 68.9 | 5.3 | | 3.1 | 21.4 | 1.3 | 57.5 | |
| 23 | 10 | 1 | 2.5 | 440 | 70.2 | 72.1 | 2.4 | | 2 | 21.9 | 1.5 | 50.6 | |
| 24 | 10 | 1 | 25 | 400 | 33 | 84.3 | 5.2 | | 3.1 | 7.4 | | 27.8 | |
| 25 | 10 | 1 | 25 | 440 | 66 | 76.2 | 2.7 | | 2.1 | 16.9 | 1.97 | 50.3 | 90% TeO₂. |
| 26 | 10 | 1 | 25 | 460 | 75 | 77.1 | 1.6 | | 1.3 | 18.3 | 1.62 | 57.8 | |
| 27 | 10 | 1 | 25 | 440 | 58.4 | 79.3 | 2.6 | | 2.1 | 13.8 | 2.22 | 46.3 | 10% CeO₂. |

What is claimed is:
1. A process for the conversion of an olefin selected from the group consisting of propylene and isobutylene to acrylonitrile and methacrylonitrile, respectively, comprising contacting a mixture of the said olefin, ammonia and elemental oxygen in the gaseous phase at a temperature of from about 350° C. to about 550° C., with an active catalyst consisting essentially of TeO₂ and CeO₂, the tellurium:cerium atomic ratio in such catalyst ranging from between about 9:1 to about 1:1.

2. The process as defined by claim 1, wherein the ratio of elemental oxygen to olefin in the reaction mixture ranges from between about 1:1 to about 3:1, and further wherein the ratio of ammonia to olefin in the reaction mixture ranges from between about 0.6:1 to about 2:1.

3. The process as defined by claim 2, wherein the contacting time ranges from between about 0.1 seconds to about 20 seconds.

4. The process as defined by claim 3, wherein the reaction is conducted in fluid bed.

5. The process as defined by claim 3, wherein the reaction is conducted in the presence of an inert diluent.

6. The process as defined by claim 3, wherein the active catalyst is associated with from about 85% to about 50% by weight of a support selected from the group consisting of silica, alumina, alundum and fireclay.

7. The process as defined by claim 6, wherein the support is silica.

8. The process as defined by claim 3, wherein the contacting time ranges from between about 0.5 seconds to about 15 seconds, at a temperature of from about 380° C. to about 500° C., and at a pressure of about atmospheric.

9. The process as defined by claim 3, wherein propylene is converted to acrylonitrile.

10. The process as defined by claim 3, wherein isobutylene is converted to methacrylonitrile.

References Cited

UNITED STATES PATENTS 3,226,421   12/1965   Giordano et al. ---- 260—465.3
3,338,952   8/1967    Callahan et al. ---- 260—465.3

JOSEPH P. BRUST, Primary Examiner.

U.S. Cl. X.R.

252—439; 260—604